US009230260B2

United States Patent
Williams et al.

(10) Patent No.: US 9,230,260 B2
(45) Date of Patent: Jan. 5, 2016

(54) SYSTEM AND METHOD FOR INSTANT DEALS IN A MOBILE COMMUNICATION NETWORK

(75) Inventors: David Lothele Williams, Menlo Park, CA (US); Rohan Koduvayur Krishnan Chandran, Sunnyvale, CA (US); Kelvin Voon-Kit Chong, Mountain View, CA (US); Srinivas A. Mandyam, San Jose, CA (US); Krishna Vedati, Los Altos, CA (US)

(73) Assignee: YellowPages.com LLC, Tucker, GA (US)

( * ) Notice: Subject to any disclaimer, the term of this patent is extended or adjusted under 35 U.S.C. 154(b) by 647 days.

(21) Appl. No.: 13/310,492

(22) Filed: Dec. 2, 2011

(65) Prior Publication Data
US 2013/0144708 A1 Jun. 6, 2013

(51) Int. Cl.
*G06Q 30/00* (2012.01)
*G06Q 30/02* (2012.01)
*H04W 4/02* (2009.01)

(52) U.S. Cl.
CPC .............. *G06Q 30/02* (2013.01); *H04W 4/021* (2013.01)

(58) Field of Classification Search
CPC .................................................. G06Q 30/0251
USPC .......................................................... 705/14
See application file for complete search history.

(56) References Cited

U.S. PATENT DOCUMENTS

| | | | | |
|---|---|---|---|---|
| 6,647,269 | B2* | 11/2003 | Hendrey et al. | 455/456.3 |
| 7,813,741 | B2* | 10/2010 | Hendrey et al. | 455/456.1 |
| 2002/0065713 | A1* | 5/2002 | Awada et al. | 705/14 |
| 2003/0003929 | A1* | 1/2003 | Himmel et al. | 455/466 |
| 2009/0030812 | A1* | 1/2009 | Halcrow et al. | 705/26 |
| 2009/0216682 | A1* | 8/2009 | Foladare et al. | 705/80 |
| 2009/0239553 | A1* | 9/2009 | Wright et al. | 455/456.3 |
| 2010/0049609 | A1* | 2/2010 | Zhao et al. | 705/14.58 |
| 2010/0312646 | A1* | 12/2010 | Gupta et al. | 705/14.58 |
| 2011/0093320 | A1* | 4/2011 | Blake et al. | 705/14.16 |
| 2011/0320273 | A1* | 12/2011 | Miranda-Steiner | 705/14.49 |
| 2012/0059713 | A1* | 3/2012 | Galas et al. | 705/14.49 |
| 2012/0239483 | A1* | 9/2012 | Yankovich et al. G06Q 30/0235 705/14.35 |
| 2013/0060627 | A1* | 3/2013 | Harrison | 705/14.39 |

* cited by examiner

*Primary Examiner* — Matthew L Hamilton
(74) *Attorney, Agent, or Firm* — Alston & Bird LLP

(57) ABSTRACT

Systems and methods are provided to transmit deals, promotions and other manner of advertisements and offers to users of mobile devices that are relevant to the users' current location and intent. Users' current intent includes actions the user is likely to take in the near future, such as, for example, purchase a specific product or service. Users' probable intent is inferred from activities performed by users on their mobile devices such as, for example, user queries relating to products and services. Businesses set up offers that are directed to specific geospatial locations and specific user intent. When a user enters a geospatial location associated with an offer and manifests intent associated with the offer, the offer is transmitted to the user's mobile device.

20 Claims, 6 Drawing Sheets

US 9,230,260 B2

SYSTEM AND METHOD FOR INSTANT DEALS IN A MOBILE COMMUNICATION NETWORK

FIELD OF THE TECHNOLOGY

At least some embodiments disclosed herein relate, in general, to systems for providing information relating to businesses to end-users, and more particularly, to providing advertisements and product and service offerings to users of mobile communications networks based, at least in part, on users' real-time geospatial location.

BACKGROUND

Mobile communications networks have long been used to deliver information relating to businesses to end users. Such information includes, among other things, directory information and information relating to products and services such as, for example, advertisements of various types. Many mobile communications networks are additionally aware of end-users' geospatial location in real-time, as well as users' demographic information and online activities.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Various embodiments of the systems and methods provide information relating to businesses' deals and promotions to users of a mobile communication network, such that such deals and promotions are relevant to, inter alia, users' current geospatial location. In an embodiment, the systems and methods disclosed herein provide the capability for businesses to create "instant deals"—e.g. an offer created on a moments notice in real-time—based on, inter alia, users' current location and time. Instant deals are used, inter alia, to motivate buyer to come in to a business' location for an instant deal. An instant deal motivates a buyer to make a purchase within a short time frame, for example, in the next hour or two, as opposed to a coupon that expires in a month.

Figure 1:
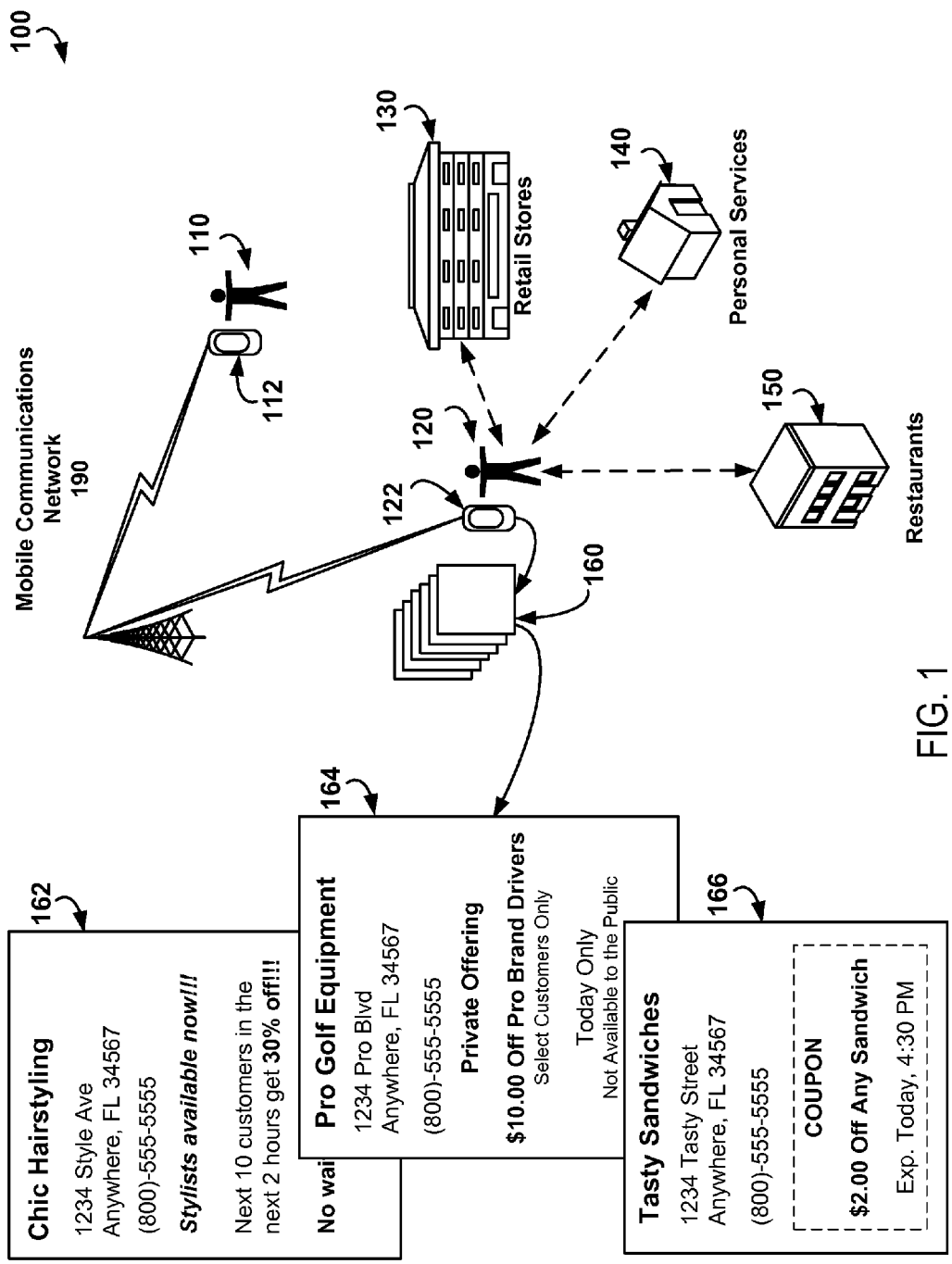
FIG. 1 shows a conceptual illustration of the operation of various embodiments of the systems and methods of the present disclosure.

FIG. 1 shows a conceptual illustration 100 of the operation of various embodiments of the systems and methods of the present disclosure.

Two users 110 and 120 are linked to a mobile communications network 190 via their respective mobile devices 112 and 122. The mobile communications network 190 can be any type of mobile communications network such as, without limitation, CDMA, GSM and satellite-based networks. The mobile devices 112 and 122 can be any type of portable device capable of communicating with the mobile network such as, without limitation, cell phones, smart phones, PDAs, tablet PC's laptop PCs and PDAs. In various embodiments, the mobile communications network 190 provides voice and messaging capabilities and may provide access to other networks such as, for example, other mobile communications networks and/or the Internet.

The mobile communications network 190 tracks the geospatial location of the users' mobile devices 112 and 122 in real-time or near-time as the devices move with their respective users 110 and 120 from point to point. In various embodiments, the location of the mobile devices is determined using any technique now known, or later to be developed, in the art. For example, in an embodiment, the mobile devices 112 and 122 themselves automatically determine their own geospatial location via built in GPS capabilities and communicate their location to the mobile communications network 190 periodically or continuously. Additionally or alternatively, in an embodiment, the mobile communications network 190 determines the location of user mobile devices 112 and 122 using capabilities inherent in the network such as by triangulation or by determining the nearest transmission tower to the devices.

In the illustrated example, the users 110 and 120 are at geospatial positions within the coverage area of the mobile communications network 190. The mobile communications network 190 is aware of, and actively tracks, the geospatial position of the users' 110 and 120 mobile devices 112 and 122. The users 110 and 120 interact with their mobile devices 112 and 122 in a variety of ways including, without limitation, sending and receiving voice and text messages, sending and receiving emails, searching for subject matter using Internet based search and/or directory services and a variety of mobile apps hosted by their client devices.

In so interacting with their mobile devices, the users 110 and 120 broadcast data relating to their intent over the mobile communications network 190. The term "intent" should be understood to refer to, without limitation, the user's intent in engaging in activities on their mobile device, and in particular, provides information suggesting actions the user currently intends to take, for example, purchase a product, eat a meal or purchase a service. In the illustrated example, the users 110 and 120 are broadcasting their intent relating to, among other things, having their hair styled or cut, purchasing golf clubs and finding a nearby restaurant.

In the illustrated example, the user 110 is not currently within close geospatial proximity of any businesses that relate to the user's intent and, therefore, the user 110 does not receive any offers relating to the user's intent. On the other hand, the user 120 is currently in close geospatial proximity (e.g. within 0.25 miles) of a variety of businesses that relate to the user's intent, including retail stores 130, personal services 140 and restaurants 150. In response to the user's 120 broadcast intent and current geospatial position, the user's mobile device 120 receives, via the mobile communication network 190, a set of offers 160 relating to the user's intent for nearby businesses.

Thus, for example, if the user 120 enters a search query on an Internet search service for "hairstyling," "hair cuts" or "beauty parlor," the user receives a offer 162 from a nearby hairstyling business (i.e. a personal service 140), offering the next 10 customers 30% off for the next two hours. In another example, if the user 120 browses a service directory (e.g. onlineYELLOW PAGES) and looks at listings for golf equipment, the user receives a offer 164 from a nearby golf equipment store (i.e. a retail store 130) offering $10 off a brand of drivers sold by the store for the day to customers receiving the offer. In yet another example, if the user 120 sends a text message to a friend inviting the friend to lunch, the user receives a offer 166 from a nearby sandwich shop (i.e. a restaurant 150) offering a $2.00 coupon that expires at 4:30 PM.

Figure 2:
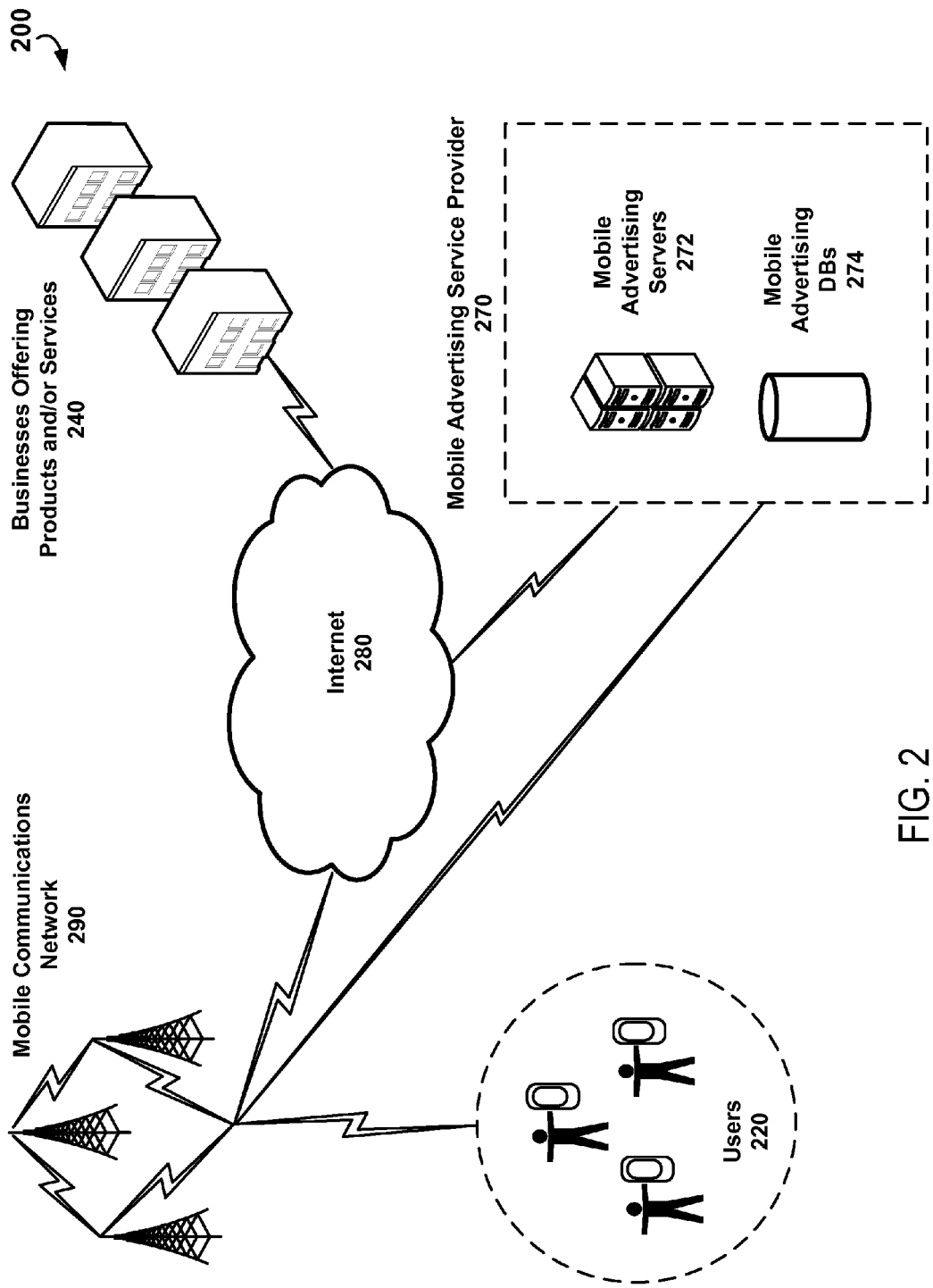
FIG. 2 illustrates an embodiment of a high level overview of a mobile advertising service provider and a network configuration through which the provider interacts with users and businesses (or other entities) that provide products and services.

In an embodiment, the offers and promotions originate from a mobile advertising service provider (not shown in FIG. 1) that broadcasts the offers 160 to the user via the mobile communications network 190. FIG. 2 illustrates an embodiment of a high-level overview 200 of mobile advertising service provider 270 and a network configuration through which the provider interacts with users 220 and service and product providers 240.

In the illustrated embodiment, a number of businesses offering products and/or services 240 wish to provide offers to users 220 via a mobile communications network 290 when such users meet user selection criteria relating to the users' current geospatial position and intent. For example, such selection criteria can select users 220 intending to purchase a particular product or service when such users are within a predefined distance of a business 240 offering such products or services. Offer criteria could additionally include any other data relevant to the offer such as, without limitation, user interests, user demographics, the product or service, the date and/or the time-of-day. In various embodiments, the user selection criteria can specify offers sent immediately to qualifying users 220 or can specify offers sent qualifying users 220 at a future point in time.

In an embodiment, the businesses 240 utilize the services of a mobile advertising service provider 270 to deliver offers to users 220 that meet the businesses' offer user selection criteria. In an embodiment, the businesses 240 communicate information defining offers, including offer details and user selection criteria, to the mobile advertising service provider 270. In various embodiments, businesses 240 communicate information defining offers to the mobile advertising service provider 270 by any conventional means such as, without limitation, the Internet 280 via email or a website provided by the mobile advertising service provider, by voice message or text message and so forth.

In an embodiment, data relating to offers and user selection criteria are stored and updated on one or more mobile advertising databases 274 maintained by the mobile advertising service provider 270 via facilities hosted on one or more mobile advertising servers. In various embodiments, offer details can specify any type of advertisement, promotion or offer that can be delivered to users 220 mobile devices. Such advertisements, promotions and offers could take the form of, without limitation, text objects, HTML objects, media objects, voice messages and text messages, and could be communicated to users 220 mobile devices via any available means such as, for example, via the Internet 280 or via any other facilities provided by the mobile communications network 290.

In an embodiment, facilities hosted on the mobile advertising servers 272 obtain data relating to the location of users 220 and the users' interactions with their mobile devices via the mobile communications network 290. In an embodiment, the mobile advertising servers 272 archive historical information on the mobile advertising databases 274 relating to users' geospatial locations over time. In an embodiment, the mobile advertising servers 272 archive historical information on the mobile advertising databases 274 relating to historical information relating to users' interactions with their mobile device over time. In an embodiment, the mobile advertising servers 272 maintain various other types of information on the mobile advertising databases 274 relating to users that may be relevant to businesses 240 such as, without limitation, user profile information, user demographics and user interests. In an embodiment, such information is obtained from any available source such as, for example, the mobile communications network 290, user profile or interest information on third party websites (not shown) or directly from the users 220 via the Internet 280.

In an embodiment, the mobile network 290 provides data relating to all users 220 of the mobile network to the mobile advertising service provider 270 on a periodic or continuous basis. In an embodiment, users 220 explicitly register with the mobile advertising service provider 270 and the mobile network 290 only provide data relating to registered users to the mobile advertising service provider 270. In an embodiment, users 220 register with the mobile advertising service provider 270 and maintain various types of profile and preference information stored on the mobile advertising databases 274 via facilities provided by the mobile advertising servers 272 such as, for example, a website.

In an embodiment, the facilities hosted on the mobile advertising servers 272 identify data relating to users' 220 intent from the data relating to the users' interactions with their mobile devices. In an embodiment, intent is inferred from text entered by users 220 into messages and/or search queries sent from the users' mobile devices using any textual, linguistic or semantic technique known in the art, for example, parsing and identifying keywords, key phrases and other textual signals within such text. Intent can also be inferred from other any other user 220 actions that do not relate to text entry, such as, for example, user selection of specific websites or directory entries. In an embodiment, historical and informational data relating to users is used to infer user intent.

In an embodiment, the facilities hosted on the mobile advertising servers 272 utilize data relating to the location of users 220 to track the current location of individual users. In an embodiment, periodically or continuously, facilities hosted on the mobile advertising servers 272 matches users 220 whose current geospatial location is known against the user selection criteria of active offers (e.g. not expired, and within any active time period specified for the offer, if applicable). In an embodiment, for at least some offers, such user selection criteria comprise solely geospatial criteria. In an embodiment, for at least some offers, such user selection criteria additionally comprise user intent criteria. In an embodiment, for at least some offers, such additionally comprise other user selection criteria such as, for example, user interests and/or demographics. In an embodiment, for at least some offers, additionally comprise temporal criteria such, for example, as date and time ranges.

In an embodiment, when the facilities hosted on the mobile advertising servers 272 match users 220 to offer selection criteria for specific offers stored on the mobile advertising databases 274, facilities on the mobile advertising servers transmit such offers to the selected users' 220 mobile devices via any available communications channels suitable for transmitting the offer to the mobile devices. In an embodiment, such channels include the Internet 280 and/or the mobile communications network 290.

In an embodiment, user 220 devices may provide facilities to filter such offers via offer selection criteria (e.g. specific categories, products, vendors and so forth), such that the user 220 devices automatically delete any offer that does not meet offer selection criteria. In an embodiment, user 220 devices may provide facilities to filter such offers via offer rejection criteria (e.g. specific categories, products, vendors and so forth), such that the user 220 devices automatically delete any offer that meets offer rejection criteria. In an embodiment, the mobile advertising service provider 270 provides facilities, via the mobile advertising servers, 272 to maintain preferences for individual users 220 that include offer filtration criteria (e.g. offer selection and/or rejection criteria) such that the mobile advertising servers 272 filter offers initially selected for individual users using the individual user's filtration criteria.

In an embodiment, businesses 240 can, using facilities hosted on the mobile advertising servers 272, issue user location queries to determine if any users 220 known to the system are currently in a specific geographic location or area. In an embodiment, such queries may additionally include query criteria relating to users' 220 intent. In an embodiment, such queries may additionally include query criteria relating to any other data relating to users 220 that may be relevant such as, for example, user interests or demographics. In an embodiment, certain demographics or other user attributes cannot be used in queries where such attributes specifically identify a group at potentially at risk for exploitation or abuse, for example, gender, age or a combination of gender and age.

In an embodiment, the results of user location queries by businesses 240 simply return a count of users 220 meeting user location query criteria. For example, a if a sushi restaurant in a mall issues a user location query for users 220 in the mall that intend to eat and like sushi, the system returns a count of the users meeting such criteria. In an embodiment, due to privacy concerns, the system does not reveal the identity of specific users meeting user location query criteria or any other details relating to such users as individuals, nor, in some embodiments, their precise geospatial location.

In an embodiment, if the results of a user location query by a business 240 indicate one or more users 220 meet query criteria, the business can, using facilities hosted on the mobile advertising servers 272, send one or more offers to the mobile advertising service provider 270 that are immediately delivered to the selected users.

Figure 3:
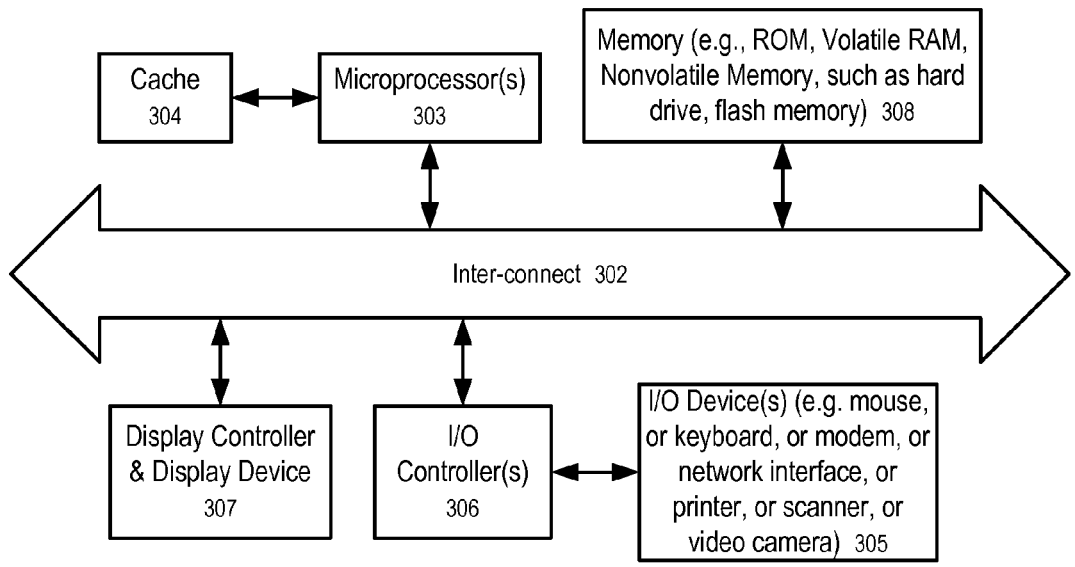
FIG. 3 shows a block diagram of a data processing system that can be used in various embodiments of the disclosed system and method.

FIG. 3 shows a block diagram of a data processing system which can be used in various embodiments of the disclosed system and method. While FIG. 3 illustrates various components of a computer system, it is not intended to represent any particular architecture or manner of interconnecting the components. Other systems that have fewer or more components may also be used.

In FIG. 3, the system 301 includes an inter-connect 302 (e.g., bus and system core logic), which interconnects a microprocessor(s) 303 and memory 308. The microprocessor 303 is coupled to cache memory 304 in the example of FIG. 3.

The inter-connect 302 interconnects the microprocessor(s) 303 and the memory 308 together and also interconnects them to a display controller and display device 307 and to peripheral devices such as input/output (I/O) devices 305 through an input/output controller(s) 306. Typical I/O devices include mice, keyboards, modems, network interfaces, printers, scanners, video cameras and other devices which are well known in the art.

The inter-connect 302 may include one or more buses connected to one another through various bridges, controllers and/or adapters. In one embodiment the I/O controller 306 includes a USB (Universal Serial Bus) adapter for controlling USB peripherals, and/or an IEEE-1394 bus adapter for controlling IEEE-1394 peripherals.

The memory 308 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In an embodiment, the mobile advertising servers 272 of FIG. 2 are implemented using one or more data processing systems as illustrated in FIG. 3. In an embodiment, user devices such as user mobile devices 112 and 122 of FIGS. 1 and 220 of FIG. 2 are implemented using one or more data processing system as illustrated in FIG. 3.

In some embodiments, one or more servers of the system illustrated in FIG. 3 are replaced with the service of a peer to peer network or a cloud configuration of a plurality of data processing systems, or a network of distributed computing systems. The peer to peer network, or cloud based server system, can be collectively viewed as a server data processing system.

Embodiments of the disclosure can be implemented via the microprocessor(s) 303 and/or the memory 308. For example, the functionalities described above can be partially implemented via hardware logic in the microprocessor(s) 303 and partially using the instructions stored in the memory 308. Some embodiments are implemented using the microprocessor(s) 303 without additional instructions stored in the memory 308. Some embodiments are implemented using the instructions stored in the memory 308 for execution by one or more general purpose microprocessor(s) 303. Thus, the disclosure is not limited to a specific configuration of hardware and/or software.

Figure 4:
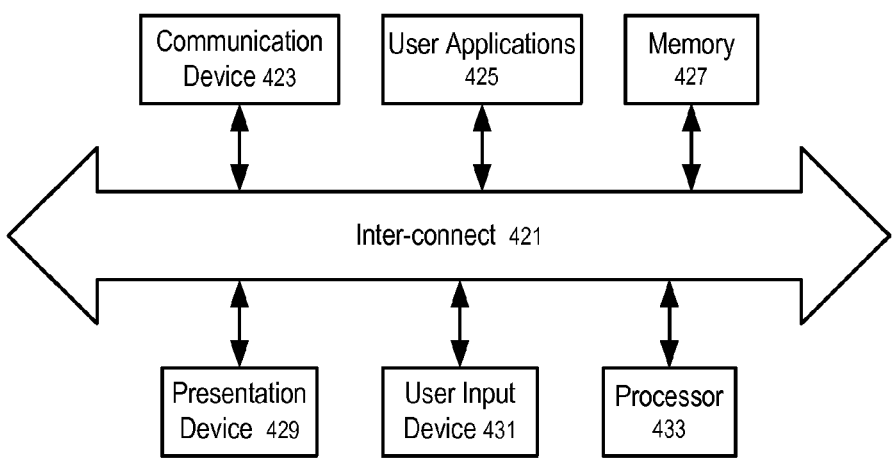
FIG. 4 shows a block diagram of a user device according to one embodiment.

FIG. 4 shows a block diagram of a user device, such as the devices 1112 and 122 of FIGS. 1 and 220 of FIG. 2 according to one embodiment. In FIG. 4, the user device includes an inter-connect 421 connecting a communication device 423, such as a network interface device, a presentation device 429, such as a display screen, a user input device 431, such as a keyboard or touch screen, user applications 425 implemented as hardware, software, firmware or a combination of any of such media, such various user applications (e.g. apps), a memory 427, such as RAM or magnetic storage, and a processor 433 that, inter alia, executes the user applications 425.

In one embodiment, the user applications implement one or more user interfaces displayed on the presentation device 429 that provides users the capabilities to, for example, access the Internet, send and receive messages and/or receive and display offers transmitted by a mobile advertising service provider such as the provider 270 or FIG. 2. In one embodiment, the user applications uses the communication device to communicate with mobile advertising servers such as that shown in 272 of FIG. 2 to retrieve data relating to businesses stored in the address book database stored in local memory 427.

In one embodiment, users use the user input device 431 to interacts with the device via the user applications 425 supported by the device, for example, by accessing and interacting with websites, messages and offers described in detail above with respect to FIGS. 1 and 2. The user input device 431 may include a text input device, a still image camera, a video camera, and/or a sound recorder, etc.

Figure 5:
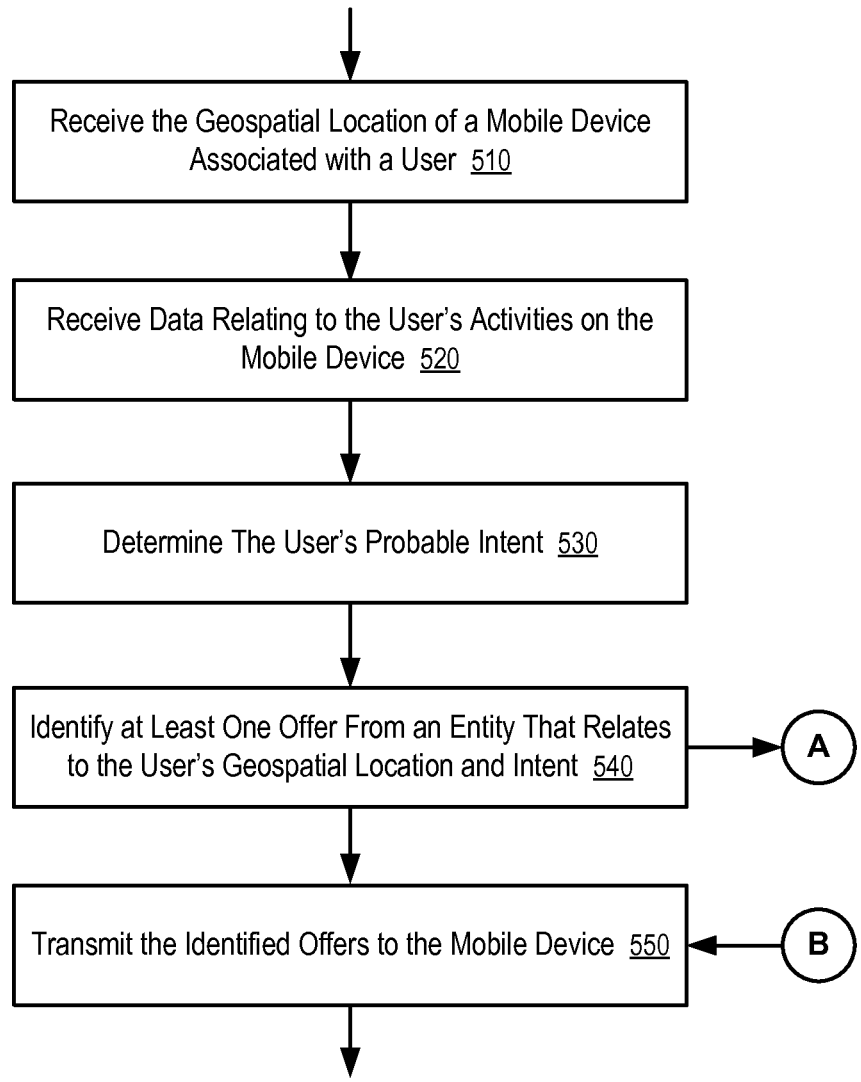
FIG. 5 shows a method for delivering offers to a user that relate to the user's geospatial location and intent.

FIG. 5 shows a method for delivering offers to a user that relate to the user's geospatial location and intent. In one embodiment, one or more servers such as the mobile advertising servers shown in 272 of FIG. 2 perform the operations of the method shown in FIG. 5, and mobile advertising databases such as that shown in 274 of FIG. 2 store the data collected and stored by the method.

In the first operation of the method, one or more processes running on a server receive 510, over a network, the geospatial location of a mobile device associated with a user 510. In an embodiment, the geospatial location of the mobile device is received in any format now known or later to be developed in the art such as, for example, latitude and longitude, GPS coordinates, and so forth. In an embodiment, a mobile communication network pushes the location data to the server without an explicit request. In an embodiment, the server issues one or more requests for data to the mobile communications network, for example, for data relating to users known to a mobile advertising service provider, or alternatively, for all users known to the mobile communications network.

In the second operation of the method, one or more processes running on the server receive 520, over the network, data relating to users activities on their mobile devices. In an embodiment, such data includes, without limitation, data relating to sending and receiving voice and text messages, sending and receiving emails, searching for subject matter using Internet based search and/or directory services and a data from a variety of mobile apps hosted by users client devices. In an embodiment, a mobile communication network automatically collects the location data and pushes the data to the server without the need for the server to explicitly request the data. In an embodiment, the server issues one or more requests for data relating to user activities to the mobile communications network, for example, for data relating to users known to a mobile advertising service provider, or alternatively, for all users known to the mobile communications network.

In an embodiment, data relating to users activities on their mobile devices is additionally or alternatively derived by the processes running on the server from relatively static data relating to user interests, for example, user interests as reflected in user profile data, a user wish list or a user gift list hosted on user mobile devices. In an embodiment, the processes running on the server supplement the data relating to user activities with user profile data or any other data relating to users hosted on user mobile devices, hosted by a mobile advertising service provider server or hosted by a third-party website such as, for example, a social networking website.

In the third operation of the method, one or more processes running on the server determine 530 user's probable intent using at least a portion of the data relating to users' actions. In an embodiment, the processes running on the server infer a user's intent from text created by user actions using any textual, linguistic or semantic technique known in the art, for example, parsing and identifying keywords, key phrases and other textual signals within such text. In an embodiment, the processes running on the server infer a user's intent from other any other user actions that do not relate to text entry, such as, for example, user selection of specific websites or directory entries.

In an embodiment, processes running on the server determines users' probable intent based on recent data, for example, using data from activities of the user occurring in a sliding time frame, for example, in the last three hours. In an embodiment, historical and informational data relating to users is used to infer users' intent, for example, from the last thirty or sixty days.

In the fourth operation of the method, one or more processes running on the server identify 540 at least one offer from an entity that relates to the user's geospatial location and the user's probable intent. In an embodiment, the processes running on the server identify the offers on a database hosted by a mobile advertising service as described in detail below with reference to FIG. 6. In an embodiment, the processes running on the server receiving the offers from offering entities in real-time as described in detail below with reference to FIG. 7.

In an embodiment, offers can take any form now known or later to be developed in the art, such as, for example:

A limited time sale.
A coupon.
A private offering.
A text message.
An audio message.
A multimedia object.
An email.
An "Easter Egg," where the user is directed to hunt for a specific object somewhere in a limited geospatial area. For example, suppose there is a there is a 50 percent coupon located in a mall. The offer will be designed to lead users to a particular place in the mall so they will go and visit that location. A store may offer a big sale on an item of furniture in order to get the customers to traverse through other parts of the store to get to the furniture department where the sale offer item is located.

In the fifth operation of the method, one or more processes running on the server transmit 550, over the network, the identified offers to users' mobile devices using facilities provided by the mobile communications network including, without limitation, text messaging, voice messaging and/or multimedia messaging capacities provided by the network. In an embodiment, the users' mobile devices receive and display offers by opening an application designed for displaying offers. In an embodiment, the mobile advertising service transmits offers as flash files that are immediately displayed by user mobile devices without any action on the part of the user.

Figure 6:
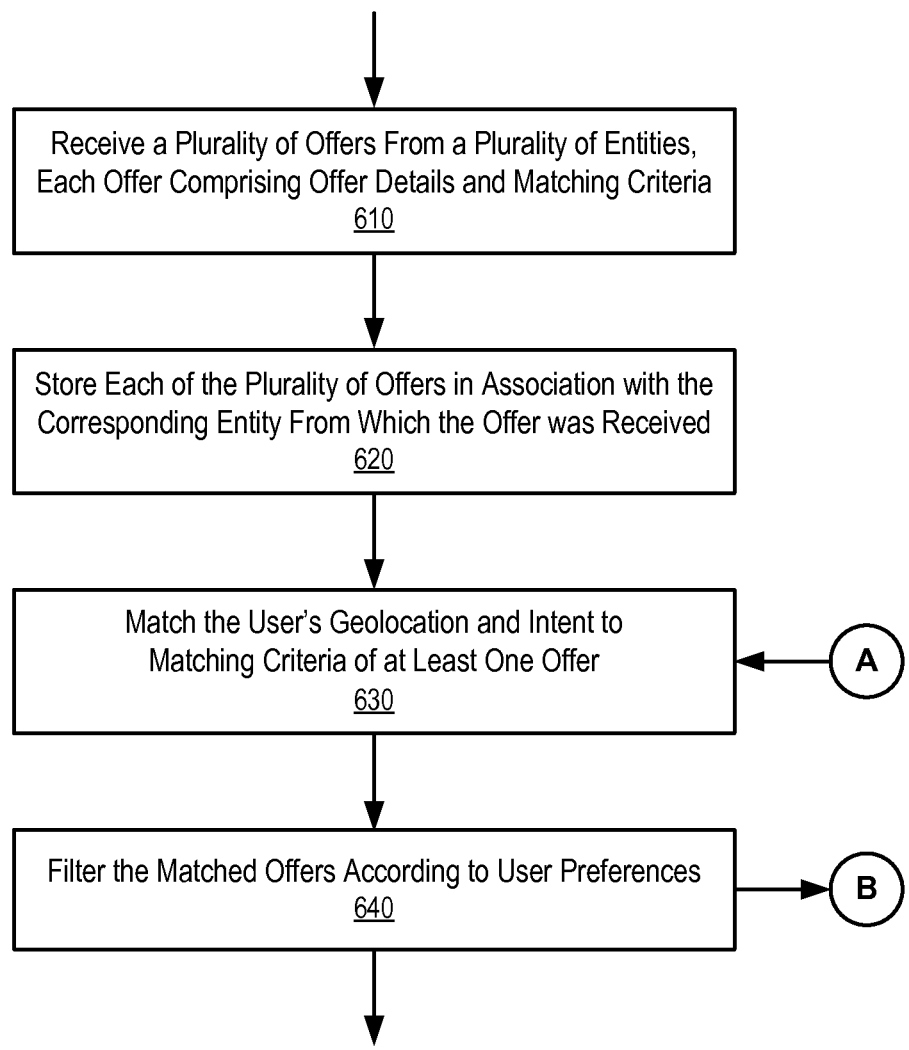
FIG. 6 shows a method for identifying offers on a database that relate to a user's geospatial location and intent.

FIG. 6 shows a method for identifying offers on a database that relate to a user's geospatial location and intent. In one embodiment, one or more servers such as the mobile advertising servers shown in 272 of FIG. 2 perform the operations of the method shown in FIG. 6, and mobile advertising databases such as that shown in 274 of FIG. 2 store the data collected and stored by the method.

In the first operation of the method, one or more processes running on a server receive 610, over a network, a plurality of offers from a plurality of entities. Each offer comprises offer details and offer matching criteria. In an embodiment, offer matching criteria for each offer comprise a respective offer geospatial location and a respective offer intent. In an embodiment, the offers are received via any conventional means for example, via a mobile communications network, via the Internet and/or an internal network of a mobile advertising service provider. In an embodiment, the processes running on a server receive the offers in any format suitable for transmission of offer and/or advertisement data for example, via text messages, voice messages, text files in any format such as XML, multimedia files, emails and so forth.

In an embodiment, the offer geospatial location specifies a geospatial point or a geospatial area in which a user must be present to receive the offer. In an embodiment, the geospatial area is defined using any two or three dimensional format such as, for example:

A circle or sphere with a fixed radius surrounding a point.
A rectangle with a fixed dimensions centered on a point.
The boundaries of a building or a location within a building.
The boundaries of a neighborhood, a city or a state.
A road.

In an embodiment, offer details provide various data that define the nature and duration of an offer and can additionally include multimedia objects such as images, audio files and/or audiovisual data. In an embodiment, offer details could include one or more of the following fields:

Offer address.
Offer start date and time.
Offer end date and time.
Offer value (e.g. $2.00, 30% off, buy one get one free and/or rewards points).
Offer product.
Offer brand.
Freeform text.

In an embodiment, offering entities set up deals ahead of time, possible day or weeks in advance. For example:

A business might have predictable slow times and wish to offset the slow downs with targeted instant deals.
For example, a sandwich business which has slow times will want to motivate a customers come in and buy a sandwich during off peak sales times—the business could, for example offer half off all sandwiches during 11 AM to 1 PM on Saturdays and Sundays
On the weekend, merchants located adjacent to corporate offices may not generate as much revenue and may choose to use innovative-targeted advertising to draw in customers.
Businesses may set up standing offers to people who are looking for a specific product, are good patrons and/or are in the area.

In an embodiment, offering entities set up deals for immediate execution. For example:

A business may have some spare perishable inventory and can unload such excess inventory at a discount to prevent loss by sending out targeted deals.
A hairstylist shop can send out deals when a number of stylists are not busy and cut back on the deals as the stylists become busy again—for the next 2 hours, the next 10 people that come in get a 30% discount.

In various embodiments, offer intent is expressed in any suitable format such as, for example, keywords and/or key phrases. In an embodiment, keywords and key phrases relating to offer intent could include:

Intended actions such as "purchase," "buy," "evaluate," "test," "eat" and so forth.
A category of product or service such as "food," "sushi" or "hairstyling"
A brand.
An interest or hobby.
A mood or a state of being such as, for example, "happy," "sad," "hungry," "in a hurry" and so forth.

In an embodiment, offers are set up with no associated intent, and the mobile advertising service sends such offers to any users who fall within the geospatial parameters of the offers.

In the second operation of the method, one or more processes running on the server store 620 each offer of the plurality of offers on an offer database in association with a respective one of the plurality of entities from which the respective offer was received. In an embodiment, the offer database can be any type of database now known or later to be developed in the art such as, for example, an object oriented database or a conventional RDBMS. In an embodiment, the offers on the database are indexed by the offer's geospatial location, intent and any other relevant fields such as, for example, starting date and time and ending date and time In the third operation of the method, one or more processes running on the server match a user's geospatial location and intent to the respective offer matching criteria of at least one offer of the plurality of offers stored on the offer database. In an embodiment, the processes running on the server receive a user's geospatial location and intent using the processes described above with reference to FIG. 5.

In the fourth operation of the method, one or more processes running on the server filter 640 the matched offers according to user preferences. In an embodiment, user preferences comprise topics or types of sales for which the user wishes to see offers such as A category of product or service such as "food," "sushi" or "hairstyling."
A brand.
An interest or hobby.
Instant coupons.

In an embodiment, if an offer does not fall within user preferences, the offer is not transmitted to the user. Additionally or alternatively, user preferences could include topics for which the user does not wish to see offers, such as a disfavored brand. In an embodiment, a user explicitly defines his or her preferences, for example, via a user website provided by the mobile advertising service. Additionally or alternatively, the mobile advertising service automatically determines user preferences using user profile data and/or data relating to a users' online activities.

In an embodiment, one or more processes running on the server then transmit the respective offer details of the matched and filtered offers to the user's mobile device. In an embodiment, the processes running on the server transmit the matched and filtered offers to the user's mobile devices using the processes described above with reference to FIG. 5.

Figure 7:
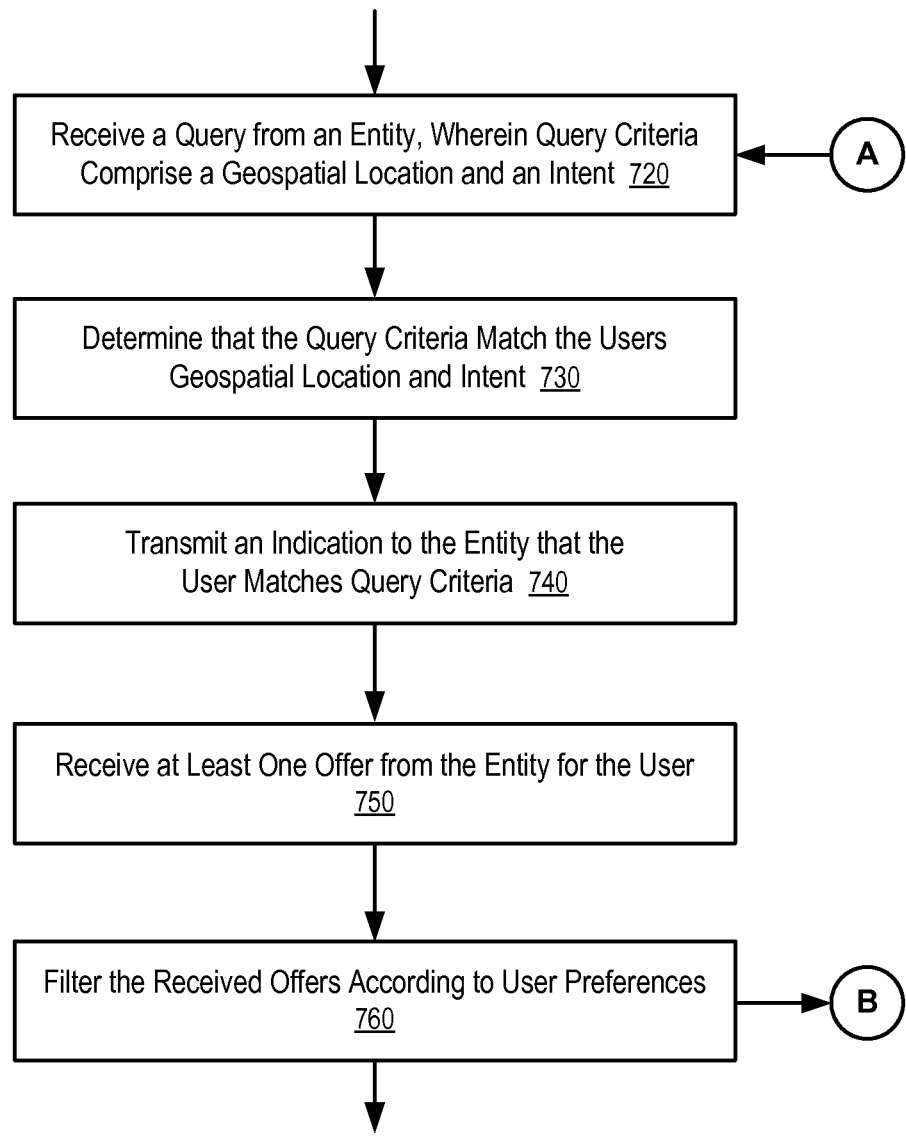
FIG. 7 shows a method for receiving offers that relate to a user's geospatial location and intent via a query facility that allows entities to detect the presence of the users in a geospatial location having a specific intent and make offers to such users.

FIG. 7 shows a method for identifying offers that relate to a user's geospatial location and intent via a query facility that allows entities to detect the presence of the users in a geospatial location having a specific intent. In one embodiment, one or more servers such as the mobile advertising servers shown in 272 of FIG. 2 perform the operations of the method shown in FIG. 7, and mobile advertising databases such as that shown in 274 of FIG. 2 store the data collected and stored by the method.

Prior to the execution of the method, in an embodiment, the processes running on the server receive users' geospatial location and intent using the process described above with reference to FIG. 5. In an embodiment, the mobile advertising service tracks the location of a plurality of users in real-time. In an embodiment, the mobile advertising service retains a historical record of users' locations for a fixed or variable period of time, for example, for thirty or sixty days.

In the first operation of the method, one or more processes running on the server receive 710, over a network, a query from an entity such as a business. The query comprises query criteria comprising a query geospatial location and a query intent. In one example, assume a sushi restaurant in a mall wants to know how many potential customers are in the mall who intend to eat and who like sushi. The restaurant submits a query comprising a geospatial location corresponding to all, or a portion, of the mall, and an intent corresponding to eating and sushi. In an embodiment, the entity submits queries to the mobile advertising service using a website provided by the mobile advertising service provider. In an embodiment, query criteria additionally include user demographics and/or user interests.

In the second operation of the method, one or more processes running on the server determine 720 that query criteria match a user's geospatial location and intent. In an embodiment, the system matches any users whose last known location falls within the query geospatial location and whose intent relates to the query intent. In an embodiment, query criteria additionally include user demographics and the processes running on the server match the criteria to user demographics, for example, in a user profile. In an embodiment, query criteria additionally include user interests and the processes running on the server match the criteria to user interests, for example, in a user profile.

In the third operation of the method, one or more processes running on the server, in response to determining 720 that query criteria matches a user's geospatial location and intent, transmit 730, over the network, to the entity, an indication that a user matches the query criteria. In an embodiment, the indication simply indicates that at least one user matches the query criteria. In an embodiment, the indication provides a count of the number of users that match the query criteria. In an embodiment, the indication provides data relating to the intent of users matched by the query. In an embodiment, the indication provides data relating to the demographics and/or interests of the users matched by the query.

If the entity receives query results indicating that one or more users match query criteria, the entity can choose to send an offer to the users matched by the query. In such case, in the fourth operation of the method, one or more processes running on the server receive 740, over the network, at least one offer from the entity for the user. In an embodiment, the offers are received via any conventional means for example, via a mobile communications network, via the Internet and/or an internal network of a mobile advertising service provider. In an embodiment, the offers are received in any format suitable for transmission of offer and/or advertisement data for example, via text messages, voice messages, text files in any format such as XML, multimedia files, emails and so forth.

In the fifth operation of the method, one or more processes running on the server filter 750 the received offers according to user preferences. In an embodiment, user preferences comprise topics or types of sales for which the user wishes to see offers. In an embodiment, if an offer does not fall within user preferences, the processes running on the server do not transmit the offer to the user. Additionally or alternatively, user preferences could include topics for which the user does not wish to see offers, such as a disfavored brand. In an embodiment, a user explicitly defines his or her preferences, for example, via a user website provided by the mobile advertising service. Additionally or alternatively, the mobile advertising service automatically determines user preferences using user profile data and/or data relating to a users' online activities.

In an embodiment, one or more processes running on the server then transmit the respective offer details of the matched and filtered offers to the user's mobile device. In an embodiment, the processes running on the server transmit the matched and filtered offers to the user's mobile devices using the processes described above with reference to FIG. 5.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
   providing an offer displayer application to a registered user, the offer displayer application for a mobile communication device associated with the registered user;
   processing a first transmission received over a network by a server system of a mobile advertising service provider, the first transmission comprising location data indicative of a device geospatial location for the mobile communication device associated with the registered user, wherein the device geospatial location comprises an automatically-gathered location based at least in part on communication of one or more wireless communication components of the mobile communication device and a global positioning system receiver of the mobile communication device, the server system comprising one or more advertising servers and one or more mobile advertising databases that store user preferences specified for the registered user, the server system:
      processing a set of one or more transmissions of data broadcast from the mobile communication device and received over the network by the server system, the data broadcast from the mobile communication device relating to actions of the registered user that correspond to user input via one or more applications on the mobile communication device and corresponding transmissions sent by the mobile communication device, the processing comprising parsing textual data to relate parsed textual data to a probable intent of the registered user, the textual data corresponding to at least a portion of the data broadcast;
      generating an offer notification to the mobile communication device associated with the registered use, by the server system, specifying an offer from a business entity, such that the offer relates to the device geospatial location and the probable intent of the registered user, wherein the generating the offer notification comprises:
         processing a query transmission received, over the network by the server system from a second device associated with the business entity, a query comprising query criteria and storing the query criteria in at least one database of the one or more mobile advertising databases of the server system, the query criteria comprising a query geospatial location and a query intent, the query intent indicating one or more future actions with respect to a product and/or a service;
         matching, by the server system, the device geospatial location and the probable intent of the registered user to the query geospatial location and the query intent, wherein the probable intent is determined to correspond to the one or more future actions with respect to the product and/or the service;
         in response to the device geospatial location and the probable intent of the registered user matching the query geospatial location and the query intent, transmitting to the second device associated with the business entity, over the network by the server system, an indication that the registered user matches the query criteria;
         processing an offer transmission received, over the network by the server system from the second device associated with the business entity, the offer transmission comprising offer details specifying the offer from the business entity in response to the indication;
         filtering, by the server system, the offer using user preferences associated with the registered user and stored in at least one database of the one or more mobile advertising databases, such that where the offer matches the user preferences, the offer notification is transmitted to the mobile communication device associated with the registered user, and where the offer does not match the user preferences, the offer notification is not transmitted to the mobile communication device associated with the registered user; and
         consequent to determining that the offer matches the user preferences, transmitting the offer notification, over the network by the server system, to the mobile communication device associated with the registered user, the network comprising a wireless communication channel, and the offer notification causing the offer displayer application installed on the mobile communication device to open and to display on the mobile communication device media content comprising one or more visual elements corresponding to offer details specifying the offer to the mobile communication device when the mobile communication device is detected to be in a geospatial area specified by the offer details.

2. The method of claim 1, wherein the data broadcast comprises a user query entered by the registered user, using the mobile communication device, into an online service providing query facilities.

3. The method of claim 2, wherein the textual data comprises keywords of the user query.

4. The method of claim 2, wherein the online service is an Internet search service.

5. The method of claim 2, wherein the online service is an online directory service.

6. The method of claim 1, wherein the data broadcast is a message sent by the registered user to a second user.

7. The method of claim 1, wherein the data broadcast comprises a list of user interests created by the registered user using the mobile communication device via a user interface provided by the mobile communication device.

8. The method of claim 1, wherein the offer is of a type selected from the group consisting of: a coupon, a private offering, a limited-time sale, and an Easter Egg.

9. The method of claim 1, wherein the offer details comprise an offer start date and time and an end date and time, such that where a current time associated with the mobile communication device does not fall between the offer start date and time and end date and time, the offer notification is not transmitted to the mobile communication device.

10. The method of claim 1, wherein the user preferences comprise at least one of: a range of times, interests of the registered user, online activities of the registered user, and/or keywords specified by the registered user.

11. The method of claim 1, further comprising:
receiving, over the network, a plurality of transmissions corresponding to a plurality offers from a plurality of business entities, each respective offer of the plurality of offers comprising respective offer details and respective offer matching criteria, the respective offer matching criteria comprising a respective offer geospatial location and a respective offer intent; and
storing, by the server system, records of the plurality of offers, such that each respective record of each respective offer of the plurality of offers is associated with a respective one of the plurality of business entities from which the respective offer was received; and
matching, by the server system, the probable intent of the registered user and the device geospatial location to the respective offer matching criteria of one offer of the plurality of offers; and
transmitting, over the network, the respective offer details of the one offer of the plurality of offers to the mobile communication device;
wherein the one offer of the plurality of offers is different from the offer received from the business entity.

12. The method of claim 11, wherein for at least the one offer of the plurality of offers, the respective offer geospatial location comprises a point.

13. The method of claim 11, wherein for at least the one offer of the plurality of offers, the respective offer geospatial location comprises a bounded geometrical figure.

14. The method of claim 11, wherein for at least the one offer of the plurality of offers, the respective offer matching criteria additionally comprises user demographics.

15. The method of claim 11, wherein for at least the one offer of the plurality of offers, the respective offer matching criteria additionally comprises user interests.

16. The method of claim 1, wherein the query criteria additionally comprises user demographics.

17. A non-transitory, machine-readable media storing instructions that, when executed by a server system, cause the server system to perform a method, the method comprising:
providing an offer displayer application to a registered user, the offer displayer application for a mobile communication device associated with the registered user;
processing a first transmission received over a network, the first transmission comprising location data indicative of a device geospatial location for the mobile communication device associated with the registered user, wherein the device geospatial location comprises an automatically-gathered location based at least in part on communication of one or more wireless communication components of the mobile communication device and a global positioning system receiver of the mobile communication device, the server system comprising one or more advertising servers and one or more mobile advertising databases that store user preferences specified for the registered user, the server system:
processing a set of one or more transmissions of data broadcast from the mobile communication device and received over the network, the data broadcast from the mobile communication device relating to actions of the registered user that correspond to user input via one or more applications on the mobile communication device and corresponding transmissions sent by the mobile communication device, the processing comprising parsing textual data to relate parsed textual data to a probable intent of the registered user, the textual data corresponding to at least a portion of the data broadcast;
generating an offer notification to the mobile communication device associated with the registered user specifying an offer from a business entity, such that the offer relates to the device geospatial location and the probable intent of the registered user, wherein the generating the offer notification comprises:
processing a query transmission received, over the network from a second device associated with the business entity, a query comprising query criteria and storing the query criteria in at least one database of the one or more mobile advertising databases of the server system, the query criteria comprising a query geospatial location and a query intent, the query intent indicating one or more future actions with respect to a product and/or a service;
matching the device geospatial location and the probable intent of the registered user to the query geospatial location and the query intent, wherein the probable intent is determined to correspond to the one or more future actions with respect to the product and/or the service;
in response to the device geospatial location and the probable intent of the registered user matching the query geospatial location and the query intent, transmitting to the second device associated with the business entity, over the network, an indication that the registered user matches the query criteria;
processing an offer transmission received, over the network from the second device associated with the business entity, the offer transmission comprising offer details specifying the offer from the business entity in response to the indication;
filtering, by the server system, the offer using user preferences associated with the registered user and stored in at least one database of the one or more mobile advertising databases, such that where the offer matches the user preferences, the offer notification is transmitted to the mobile communication device associated with the registered user, and where the offer notification does not match the user preferences, the offer is not transmitted to the mobile communication device associated with the registered user; and consequent to determining that the offer matches the user preferences, transmitting the offer notification, over the network, to the mobile communication device associated with the registered user, the network comprising a wireless communication channel, and the offer notification causing the offer displayer application installed on the mobile communication device to open and to display on the mobile communication device media content comprising one or more visual elements corresponding to offer details specifying the offer to the mobile communication device when the mobile communication device is detected to be in a geospatial area specified by the offer details.

18. A server system comprising:

one or more servers, comprising one or more processors and memory, coupled to one or more network interfaces configured to facilitate access to a network, and one or more non-transitory storage media to retain instructions, the server system to execute the instructions to:

provide an offer displayer application to a registered user, the offer displayer application for a mobile communication device associated with the registered user;

process a first transmission comprising location data indicative of a device geospatial location for the mobile communication device associated with the registered user, wherein the device geospatial location comprises an automatically-gathered location based at least in part on communication of one or more wireless communication components of the mobile communication device and a global positioning system receiver of the mobile communication device, the server system comprising one or more advertising servers and one or more mobile advertising databases that store user preferences specified for the registered user, the server system:

processing a set of one or more transmissions of data broadcast from the mobile communication device, the data broadcast from the mobile communication device relating to actions of the registered user that correspond to user input via one or more applications on the mobile communication device and corresponding transmissions sent by the mobile communication device, the processing comprising parsing textual data to relate parsed textual data to a probable intent of the registered user, the textual data corresponding to at least a portion of the data broadcast;

generating an offer notification to the mobile communication device associated with the registered user, the offer notification specifying an offer from a business entity, such that the offer relates to the device geospatial location and the probable intent of the registered user, wherein the generating the offer notification comprises:

processing a query transmission received, over the network from a second device associated with the business entity, a query comprising query criteria and storing the query criteria in at least one database of the one or more mobile advertising databases of the server system, the query criteria comprising a query geospatial location and a query intent, the query intent indicating one or more future actions with respect to a product and/or a service;

matching the device geospatial location and the probable intent of the registered user to the query geospatial location and the query intent, wherein the probable intent is determined to correspond to the one or more future actions with respect to the product and/or the service;

in response to the device geospatial location and the probable intent of the registered user matching the query geospatial location and the query intent, transmitting to the second device associated with the business entity, over the network, an indication that the registered user matches the query criteria;

processing an offer transmission received, over the network from the second device associated with the business entity, the offer transmission comprising offer details specifying the offer from the business entity in response to the indication;

filter the offer using user preferences associated with the registered user, such that where the offer matches the user preferences, the offer is transmitted to the mobile communication device associated with the user and stored in at least one database of the one or more mobile advertising databases, and where the offer notification does not match the user preferences, the offer notification is not transmitted to the mobile communication device associated with the registered user; and consequent to determining that the offer matches the user preferences, transmitting the offer notification, over the network, to the mobile communication device associated with the registered user, the network comprising a wireless communication channel, and the offer notification causing the offer displayer application installed on the mobile communication device to open and to display on the mobile communication device media content comprising one or more visual elements corresponding to offer details specifying the offer to the mobile communication device when the mobile communication device is detected to be in a geospatial area specified by the offer details.

19. The method of claim 1, wherein the indication that the registered user matches the query criteria corresponds to a count of users that match the query criteria.

20. The method of claim 1, further comprising:

automatically determining, by the server system, at least some of the user preferences at least partially based on user profile data and/or data relating to online activities of the registered user.

* * * * *

UNITED STATES PATENT AND TRADEMARK OFFICE
CERTIFICATE OF CORRECTION

PATENT NO. : 9,230,260 B2  
APPLICATION NO. : 13/310492  
DATED : January 5, 2016  
INVENTOR(S) : Williams et al.

Page 1 of 1

It is certified that error appears in the above-identified patent and that said Letters Patent is hereby corrected as shown below:

Claims

<u>Column 14</u>  
Line 4, claim 1, "use" should read --user--

Signed and Sealed this  
Twenty-eighth Day of June, 2016

Michelle K. Lee  
*Director of the United States Patent and Trademark Office*